United States Patent
Van der Meer et al.

(10) Patent No.: US 6,717,110 B2
(45) Date of Patent: *Apr. 6, 2004

(54) APPARATUS FOR TOASTING BREAD

(75) Inventors: Sijtze Van der Meer, Hoogeveen (NL); Albertus Peter Johannes Michels, Drachten (NL)

(73) Assignee: Koninklijke Philips Electronics N.V., Eindhoven (NL)

( * ) Notice: Subject to any disclaimer, the term of this patent is extended or adjusted under 35 U.S.C. 154(b) by 0 days.

This patent is subject to a terminal disclaimer.

(21) Appl. No.: 10/027,946

(22) Filed: Dec. 21, 2001

(65) Prior Publication Data

US 2002/0104444 A1 Aug. 8, 2002

(30) Foreign Application Priority Data

Dec. 22, 2000 (EP) .............................. 00204799

(51) Int. Cl.⁷ .............................. A47J 37/08; F27D 1/18
(52) U.S. Cl. .................. 219/386; 219/392; 219/405; 219/411; 99/327; 99/341
(58) Field of Search ................ 219/385, 386, 219/392, 405, 411; 99/332, 327, 341, 385, 389, 401

(56) References Cited

U.S. PATENT DOCUMENTS

| | | | |
|---|---|---|---|
| 1,656,848 A | 1/1928 | Wyatt | |
| 2,262,498 A | 11/1941 | Hansen | 219/19 |
| 2,447,641 A | 8/1948 | Dunham | 99/386 |
| 3,461,274 A | 8/1969 | Williams | 542/219 |
| 5,960,702 A | 10/1999 | Thiriat et al. | 99/327 |
| 6,125,234 A * | 9/2000 | de Jenlis | 392/439 |
| 6,357,343 B1 * | 3/2002 | Tomsich et al. | 99/329 RT |
| 6,530,309 B2 * | 3/2003 | Van Der Meer et al. | 99/331 |

FOREIGN PATENT DOCUMENTS

| | | |
|---|---|---|
| FR | 2050772 | 4/1979 |
| FR | 2707858 | 7/1993 |
| GB | 2013874 | 8/1979 |
| WO | WO97249 | 7/1997 |

* cited by examiner

*Primary Examiner*—Joseph Pelham
(74) *Attorney, Agent, or Firm*—Ernestine C. Bartlett

(57) ABSTRACT

The present invention relates to an apparatus for toasting of bread etc. comprising a housing (2) with a slot (3) which issues into a toasting space (4) into which products to be toasted can be introduced, while heater elements (5) are arranged on both sides of this space (4) which each cooperate with a reflector (7) for reflecting radiation in the direction of the toasting space (4), and the housing (2) is made at least partly of a transparent material. In order to obtain an evenly distributed browning and a good view of the products in the toasting space (4), the reflectors (7) cover the whole area of the toasting space (4) and are made of a transparent material.

12 Claims, 12 Drawing Sheets

APPARATUS FOR TOASTING BREAD

BACKGROUND OF THE INVENTION

The invention relates to an apparatus for toasting bread and the like, comprising a housing with at least one slot which issues into a toasting space in which products to be toasted can be accommodated, heater elements being arranged on either side of said space and each cooperating with a reflector arranged behind the respective element for reflecting radiation in the direction of the toasting space.

Apparatuses for toasting bread and the like are domestic appliances which have been known for a long time. Toasting of bread takes place therein by means of radiation heat which is supplied to the bread from heater elements arranged on either side of the toasting space. The heater elements are usually formed by incandescent wires which are wound around an insulating plate or by a glass-ceramic tube with a helically wound incandescent wire at the inside or outside thereof.

A problem with these appliances is that the toasting space cannot be cleaned, or with great difficulty only. The only opening is the slot for the introduction of the bread to be toasted. Bread crumbs, indeed mainly the larger bread crumbs can be removed through this opening in that the entire appliance is turned upside down and is shaken.

BRIEF SUMMARY OF THE INVENTION

It is an object of the invention to provide an apparatus for toasting bread which is easy to clean.

This object is achieved in that at least part of the housing is provided on a base part in a detachable manner. The toasting space is made readily accessible and can be easily cleaned in that said part of the housing is removed. In addition, certain components present in the toasting space may now be made removable, so that these components, such as reflectors and grille elements, can be cleaned more easily.

A wish has long been felt to render the toasting process visible from the outside so that the user can view the toasting process directly with his own eyes. A further embodiment of the apparatus is accordingly characterized in that said detachable part of the housing is transparent. It is to be noted that an apparatus for toasting bread and the like is known from FR 2707858 whose side walls and upper wall are manufactured from glass. These walls, however, are not removable, and a reflector of very small vertical dimensions is provided behind each of the heater elements so as to safeguard a better view of the product in the toasting space. This has the result that indeed the view of the product to be toasted is obstructed in the central portion of the toasting space only and that the rest of the product remains visible. A disadvantage of this known toaster is that the end walls of the apparatus are closed for the purpose of accommodating therein a motion mechanism and supply wiring for supplying an electric current to the heater elements, whereby the view of the product to be toasted is partly blocked out again. In addition, the pollution of components in the toasting space has now become visible, for which the cited document offers no solution.

An embodiment which is to be used by preference is characterized in that the housing is formed by a cloche which is manufactured from a transparent material on all sides and which surrounds the toasting space. A practically unhampered view of the product to be toasted is safeguarded thereby. The browning process can be well observed from all sides. The browning process always involves a certain amount of pollution which deposits itself on the base part and on the inside of the cloche. It is accordingly of major importance that the cloche and the base part with other constructional parts of the toaster thereon can be cleaned. This is achieved in that the cloche is placed on the base part in a detachable manner.

Another disadvantage of the toaster of FR 2707858 is the small vertical dimension of the reflector, which has the result that the browning process takes place very unevenly. This disadvantage can be counteracted in a further embodiment of the apparatus according to the invention in that the reflectors each extend over substantially the entire height and width of the toasting space, and in that the reflectors are manufactured from a transparent material. It is also achieved by means of the transparent reflectors that the view of the product being toasted is optimized. The reflectors and the cloche may be manufactured from glass.

It is to be noted that toasters provided with a window in one or both of their side walls are known per se, for example from WO 97/24967, GB 2013874, and FR 2050772. In these known toasters, the windows are generally of so small dimensions that a good view of the product being toasted is not or substantially not possible. Further disadvantages of these known toasters are that their construction is comparatively complicated and that these toasters tend to become comparatively hot on the outside during use. No measures are taken in the known toasters for cleaning thereof, which is of major importance especially for toasters made from a transparent material.

To ensure that a major portion of the heat generated by the heater elements is radiated towards the product to be toasted, according to a further embodiment of the invention, the reflectors and/or the wall of the cloche are/is provided with a transparent, infrared-reflecting coating. Such a coating may be formed, for example, by a transparent layer of a metal or a metal oxide such as, preferably, tin oxide. Such coatings, which are known per se, have the advantage that the heat radiation is reflected in the direction of the toasting space, so that the outside of the cloche remains at an acceptable temperature in every case, while these coating layers are so thin as to be transparent, whereby a good view of the products being toasted and of the browning process is safeguarded. The coatings are preferably provided on the inner wall of the cloche and on the sides of the reflectors facing towards the toasting space.

In a further embodiment, the reflectors each have a concave shape such that the radiation of the preferably rod-shaped heater elements is distributed evenly over the product to be toasted, whereby a good, homogeneous browning of the products to be toasted is guaranteed. The reflectors may then together with grille elements for centering the products to be toasted be fastened with some pivoting possibility on the heater elements by means of a connection which is preferably detachable. This has the advantage that, upon closing of the toaster, the heater elements with the reflectors provided thereon will move towards the bread to be toasted and will lie correctly against it. In another embodiment, the reflectors and/or the grille elements may be positioned detachably and/or tiltably on the base part.

BRIEF DESCRIPTION OF THE SEVERAL VIEWS OF THE DRAWING

The invention will be explained in more detail below with reference to the drawing in which an embodiment of a toaster manufactured from glass is depicted.

DETAILED DESCRIPTION OF THE INVENTION

Figure 1:
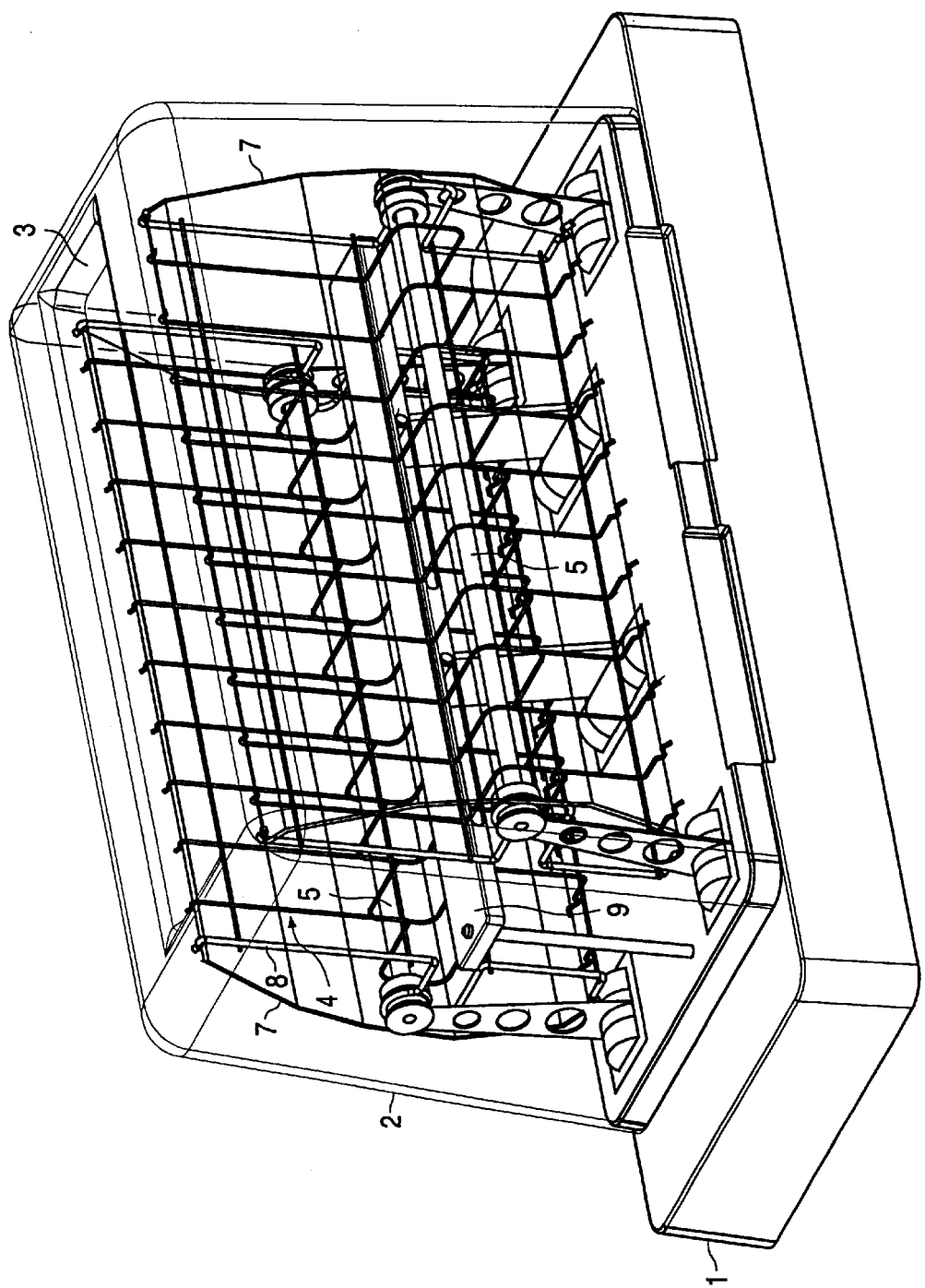
FIG. 1 is a diagrammatic perspective view not true to scale of a toaster according to the invention in the assembled state.
Figure 2:
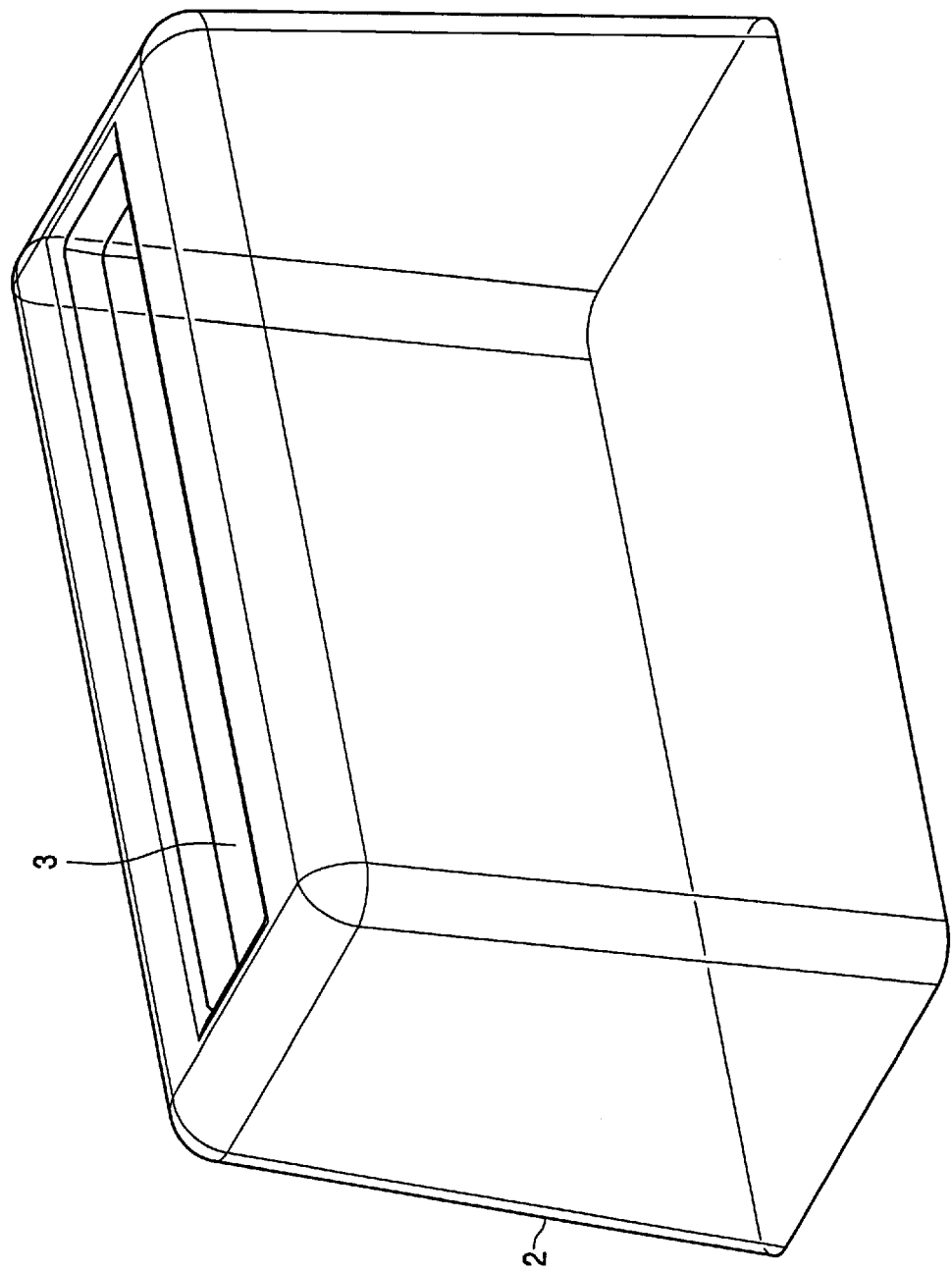
FIG. 2 is a diagrammatic perspective view not true to scale of a glass cloche which forms the upper part of the housing of the toaster of FIG. 1.
Figure 6:
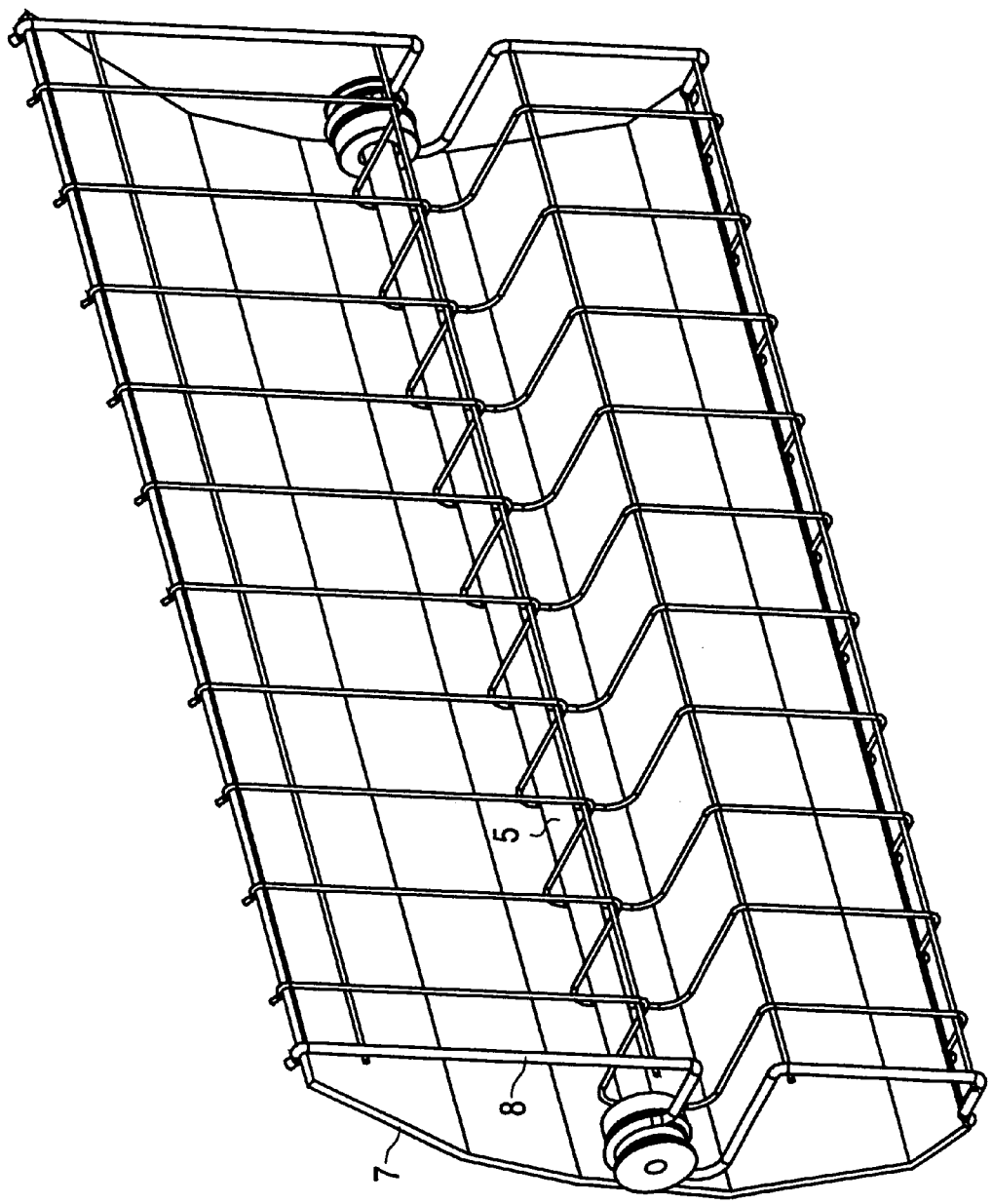
FIG. 6 diagrammatically and not true to scale shows an example of a reflector with grille elements fastened with a snap connection to a rod-shaped heater element.

In FIG. 1, reference numeral 1 denotes a base part of a toaster. A glass cloche 2 is provided on a base part 1 and is provided at its upper side with a slot-shaped entry 3 which affords access to a toasting space 4. On either side of the toasting space there are two rod-shaped heater elements 5 which in this case are each formed by a glass-ceramic tube inside which an incandescent wire is accommodated in a spiraling shape. The rod-shaped heater elements 5 are supported by arms 6 which are pivotably fastened in the base part 1, as will be explained in more detail below with reference to the detailed FIG. 4. The arms 6 are manufactured from an electrically conducting material so that further current supply wires for the heater elements 5 are not necessary. As is also shown in FIG. 6, an assembly of a reflector 7 and grille elements 8 is snapped home on each of the heater elements 5 such that this assembly can pivot somewhat about the relevant heater element 5. The reflectors may alternatively be detachably suspended together with the grille elements from the heater elements instead of being fastened by a snap joint. Each of the reflectors 7 is manufactured from glass here and is provided on its inside with a coating consisting of a thin, transparent layer of a metal or a metal oxide, preferably tin oxide.

The inner wall of the cloche 2, which forms the housing of the toaster, is also provided with such an infrared-reflecting coating of tin oxide. A toaster for bread is obtained in this manner in which the browning process of the products introduced through the slot 3 into the toasting space 4 can be very well observed from the outside because in fact the toasting space 4 is entirely surrounded by transparent glass walls. This enhances the comfort of use of the toaster to a high degree because it can now be directly seen whether the toasting process has progressed to the point where the user wishes to interrupt it.

The outside of the glass cloche 2 will remain at an acceptable temperature here because the infrared radiation of the heater elements 5 will be reflected back at least for a major portion in the direction of the product present in the toasting space by the coatings both on the reflectors and on the inside of the cloche 2, so that these coated glass walls will be heated to a low degree only.

The small thickness of said coatings means that they are practically transparent, so that the toasting process can be observed from all sides of the coaster. The number of parts projecting above the base part 1 is reduced to a minimum in this case. The grille elements are pivotably supported in the base part by means of hinges 14. The movement towards one another and away from one another of the grille elements 8 and the up-and-down movement of the bread support 9 are effected fully by operational elements which are accommodated in the base part 1.

Figure 3:
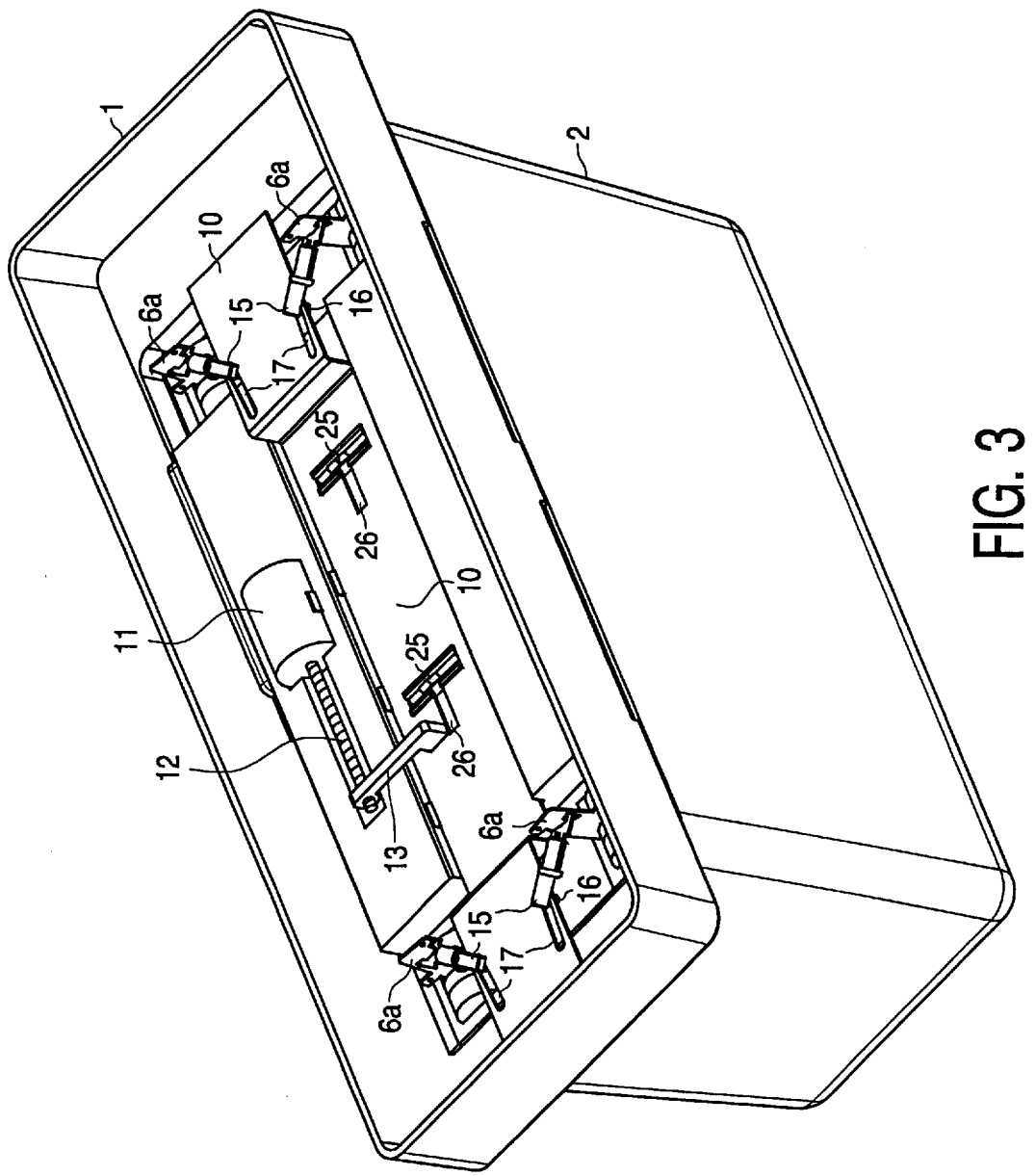
FIG. 3 is a diagrammatic elevation not true to scale of the base of the toaster of FIG. 1 with the bottom cut away.
Figure 4:
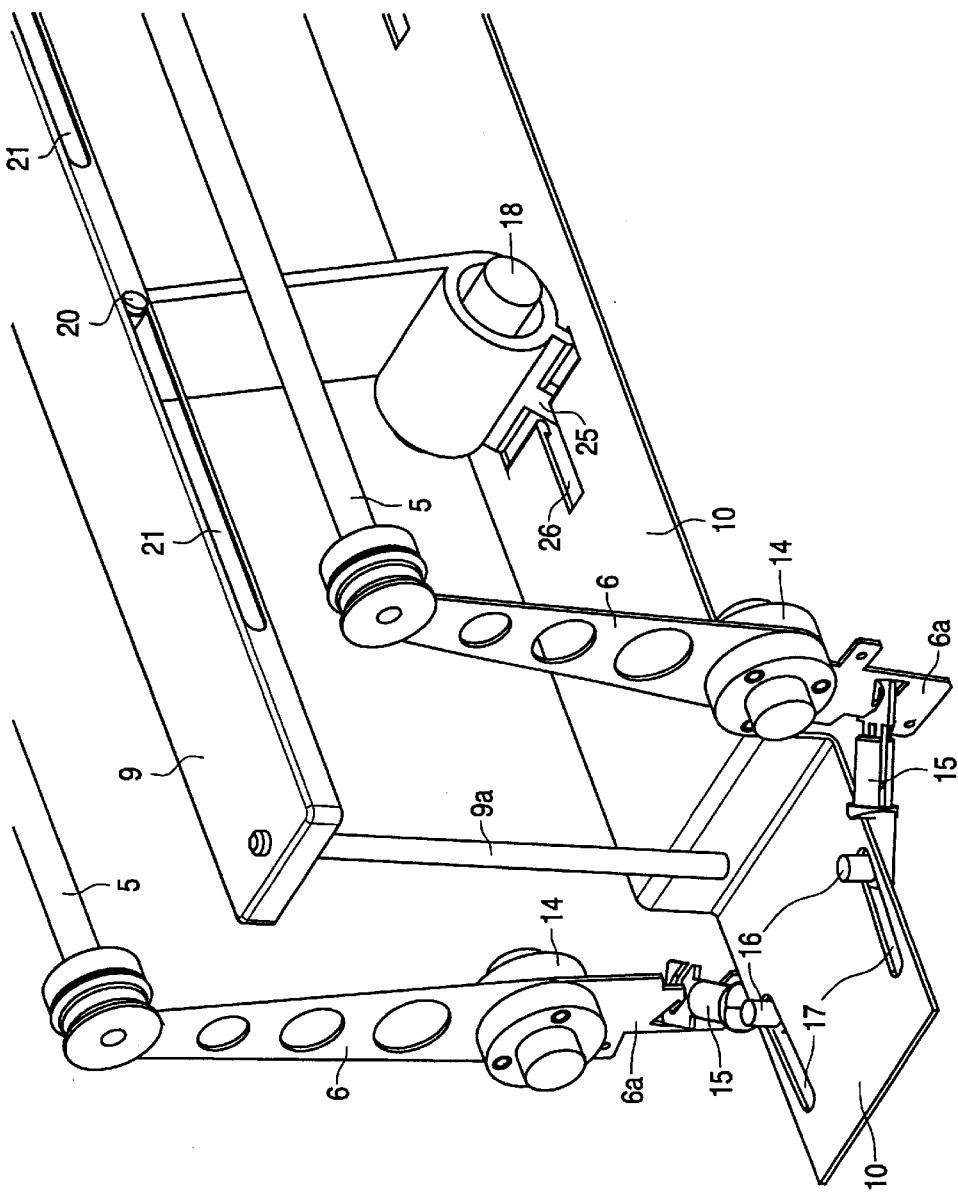
FIG. 4 shows a detail of the operating mechanism of the toaster of FIG. 1.
Figure 5A:
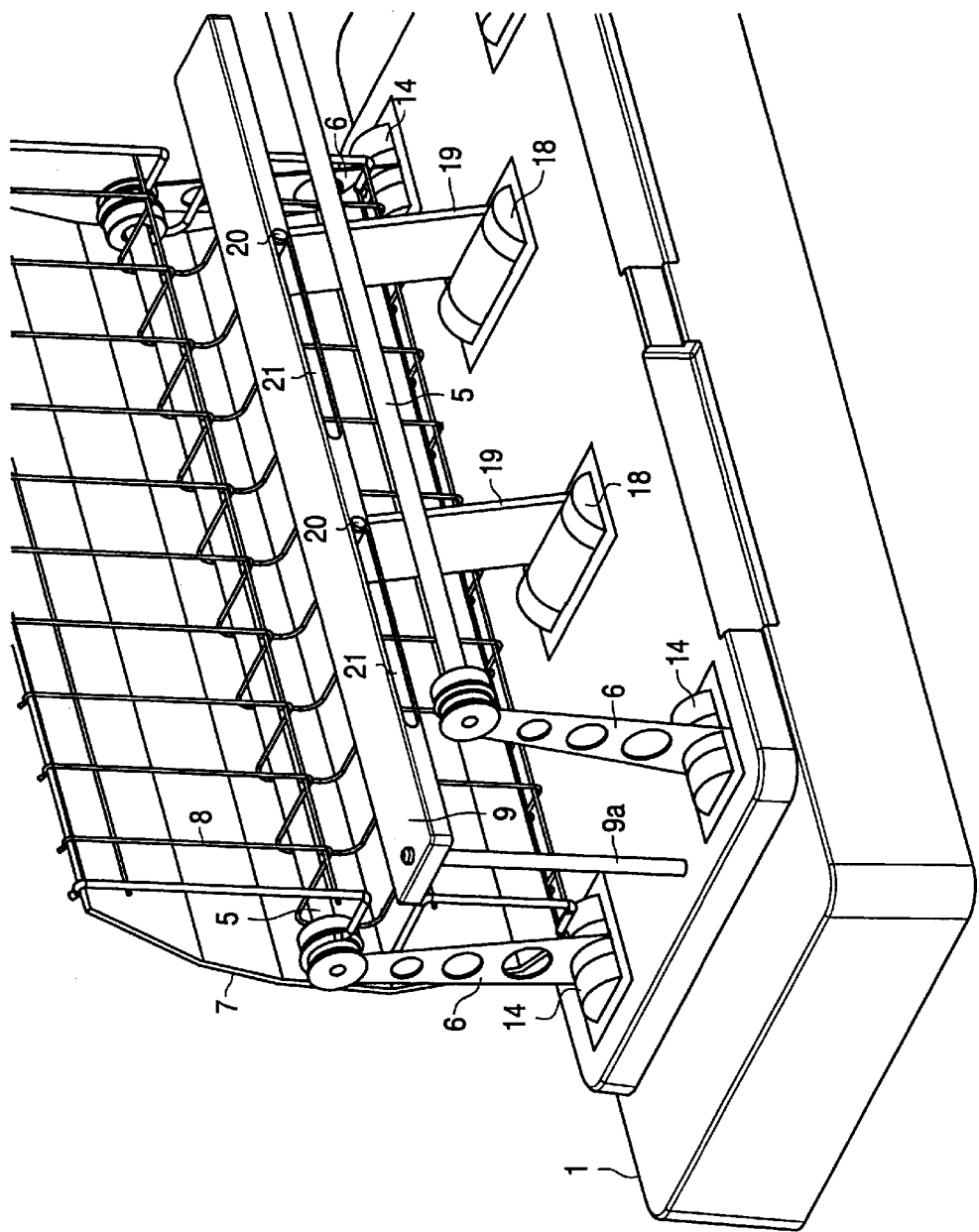
FIGS. 5a, b, c diagrammatically and not true to scale show three positions of the operating mechanism of a toaster of FIG. 1.
Figure 5B:
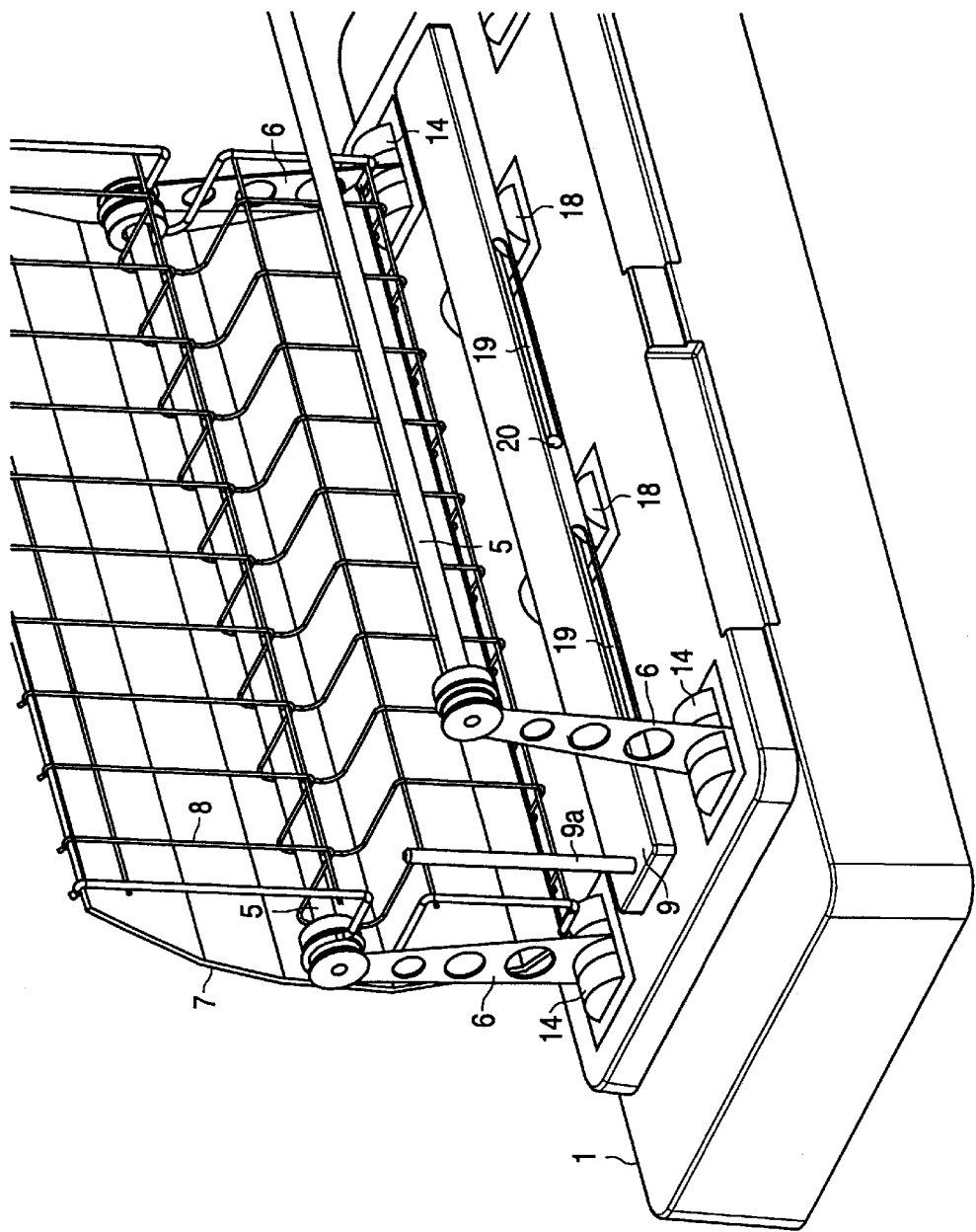
Figure 5C:
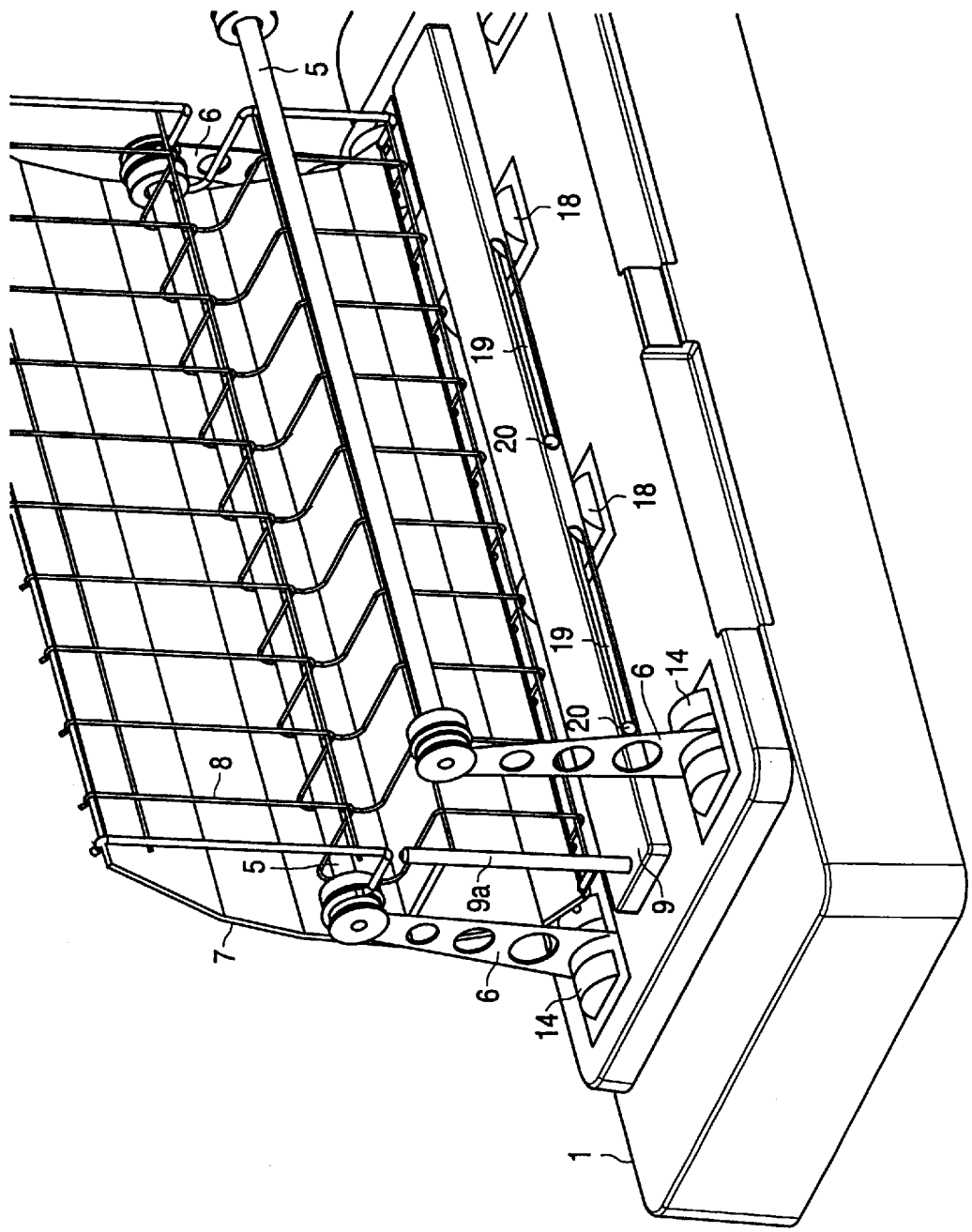

To clarify this, FIG. 3 shows the base part 1 in an open state and viewed from the lower side of the toaster, from which it is apparent that a reciprocating slide 10 is present in the base part 1, which slide can be moved back and forth by a motor 11 which is provided with a threaded spindle 12 cooperating with an arm 13 connected to the slide 10. The arms 6 carrying the heater elements 5 are connected to the base part 1 via hinges 14, as is shown in the detail of FIG. 4. The hinges 14 lie above the slide 10 here. The portion 6a of each arm 6 situated below the hinges 14 is coupled to a slot 17 in the slide 10 by means of a telescopic rod 15 and a stud 16 provided on each rod 15. The base part 1 is further provided with two hinges 18 which are each provided with a lever arm 19 with studs 20 which are each guided in a slot 21 in the bread support 9. The portion 25 of the lever 19 situated below the hinge 18 engages a recess 26 of the slide 10. FIG. 5a shows the situation in which the bread support 9 is in its uppermost position, i.e. in a position in which the bread is introduced through the entry slot 3 in the cloche 2 and is placed on the bread support. The grille elements 8, the heater elements 5, and the reflectors 7 are in their open position. The heater element is not switched on, as is usual. The recesses 17 and 26 in the slide 10 are dimensioned such that, upon starting of the motor 11, the latter puts the slide 10 in motion, whereby in a first movement phase the bread support 9 moves down into its lowermost position, i.e. an intermediate slide position as shown in FIG. 5b. The lever arms 6 do not yet move, and the grille elements 8, the heater elements 5, and the reflectors 7 are still in their open position. When the slide 10 moves further, the lever arms 6 start rotating so that the grille elements 8, the heater elements 5, and the reflectors 7 move towards one another over a small distance, whereby the bread is clamped in between the grille elements 8 and is centered at the same time. It is only in this position, a closed position as shown in FIG. 5c, that the heater elements 5 are switched on.

A toaster for bread is obtained in this manner in which there are around the toasting space no or hardly any components which hamper the view of that which takes place inside the toasting space, while practically all operational elements are accommodated in a base part which may be of a comparatively flat construction, because the operation is effected mainly by means of a horizontally moving slide 10. If the apparatus is to be cleaned, the cloche may be simply lifted from the base part. Removal of the cloche will switch off the voltage applied to the apparatus on both sides (both the neutral lead and the live lead). Cleaning is further facilitated in that both the reflectors and the grille elements are detachably mounted. The reflectors may be taken from the heater elements together with the grille elements, if so desired, whereupon the toaster becomes easily accessible for cleaning purposes.

Figure 7:
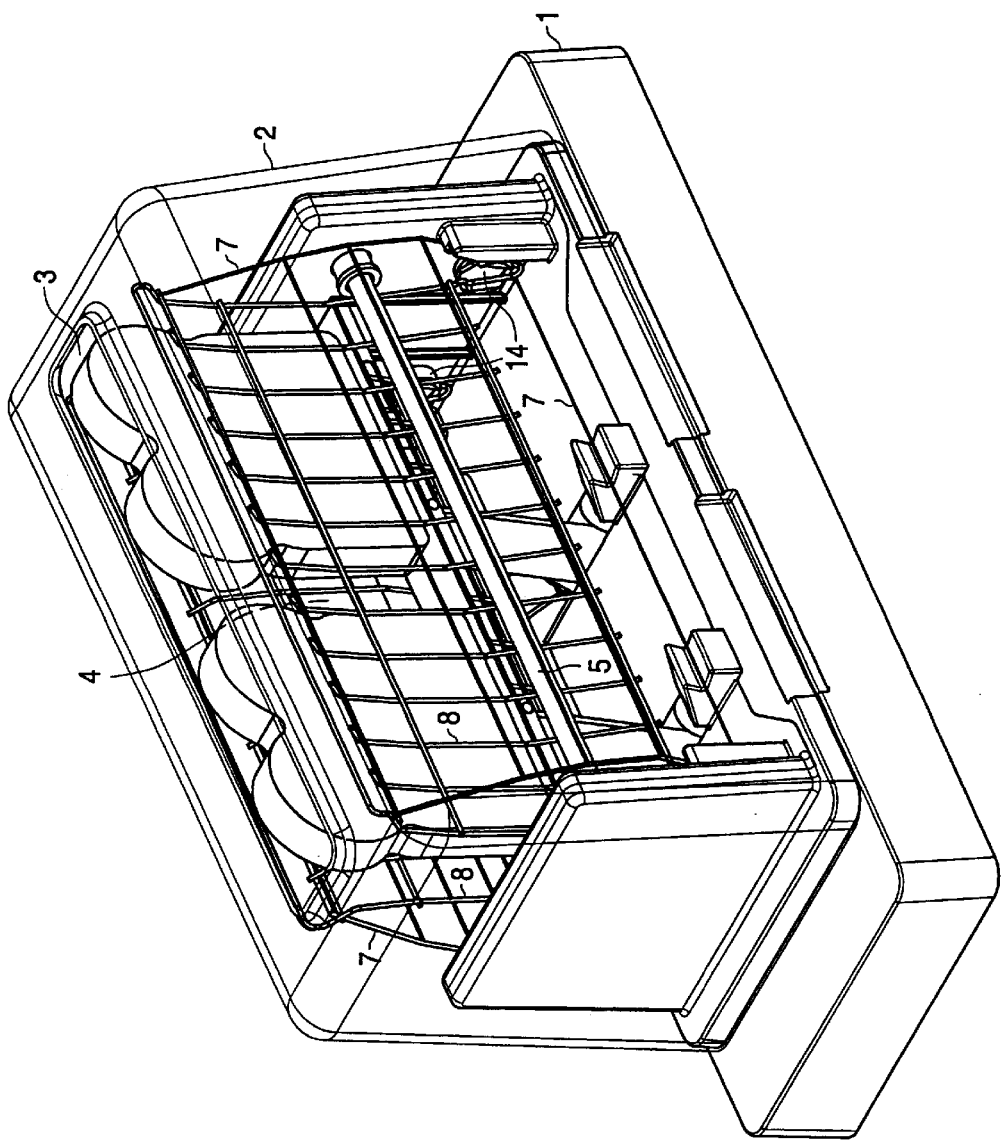
FIG. 7 is a diagrammatic perspective view of an alternative embodiment of the toaster according to the invention.
Figure 8A:
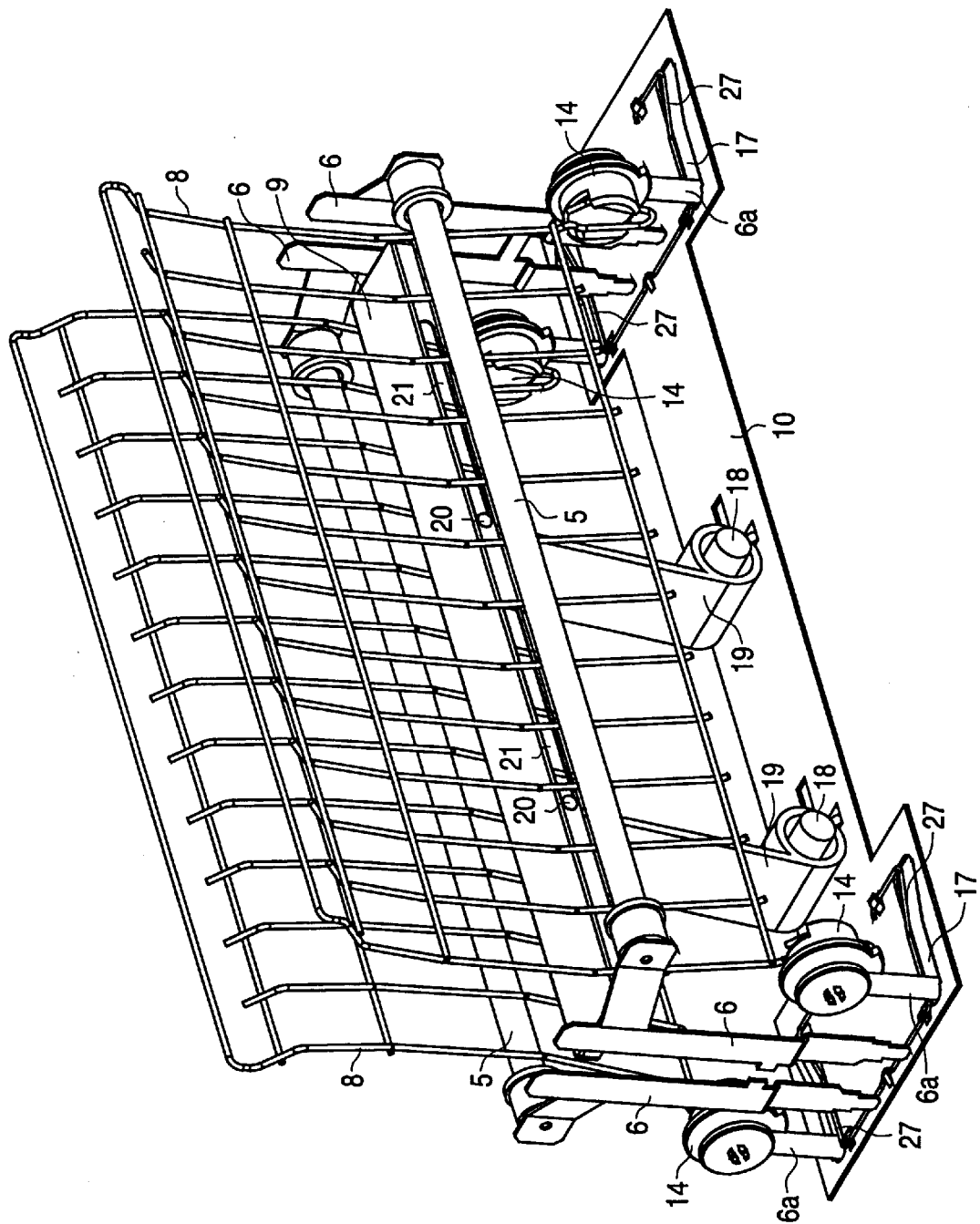
FIGS. 8a and 8b diagrammatically show the interior of the toaster of FIG. 7.
Figure 8B:
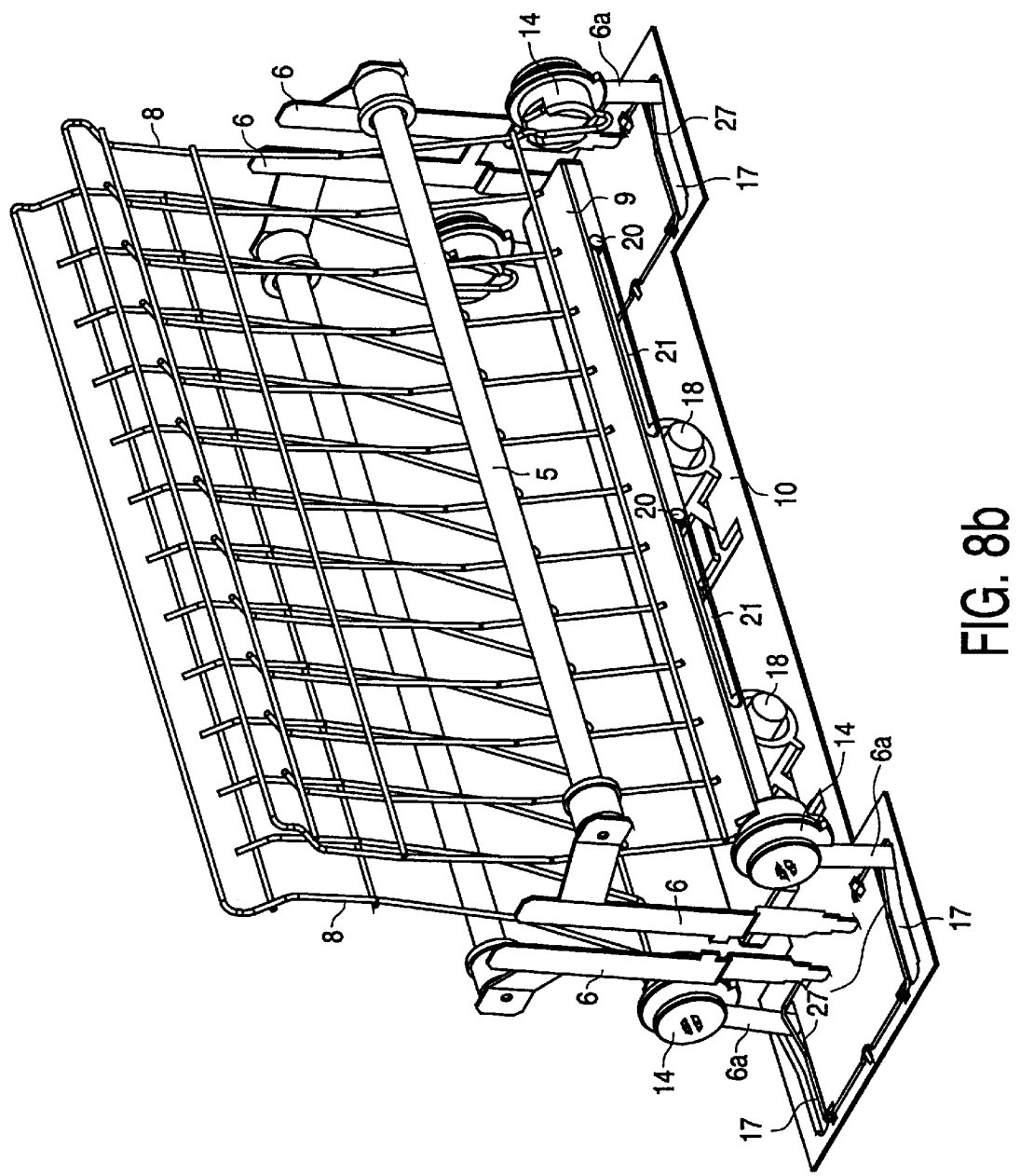
Figure 9:
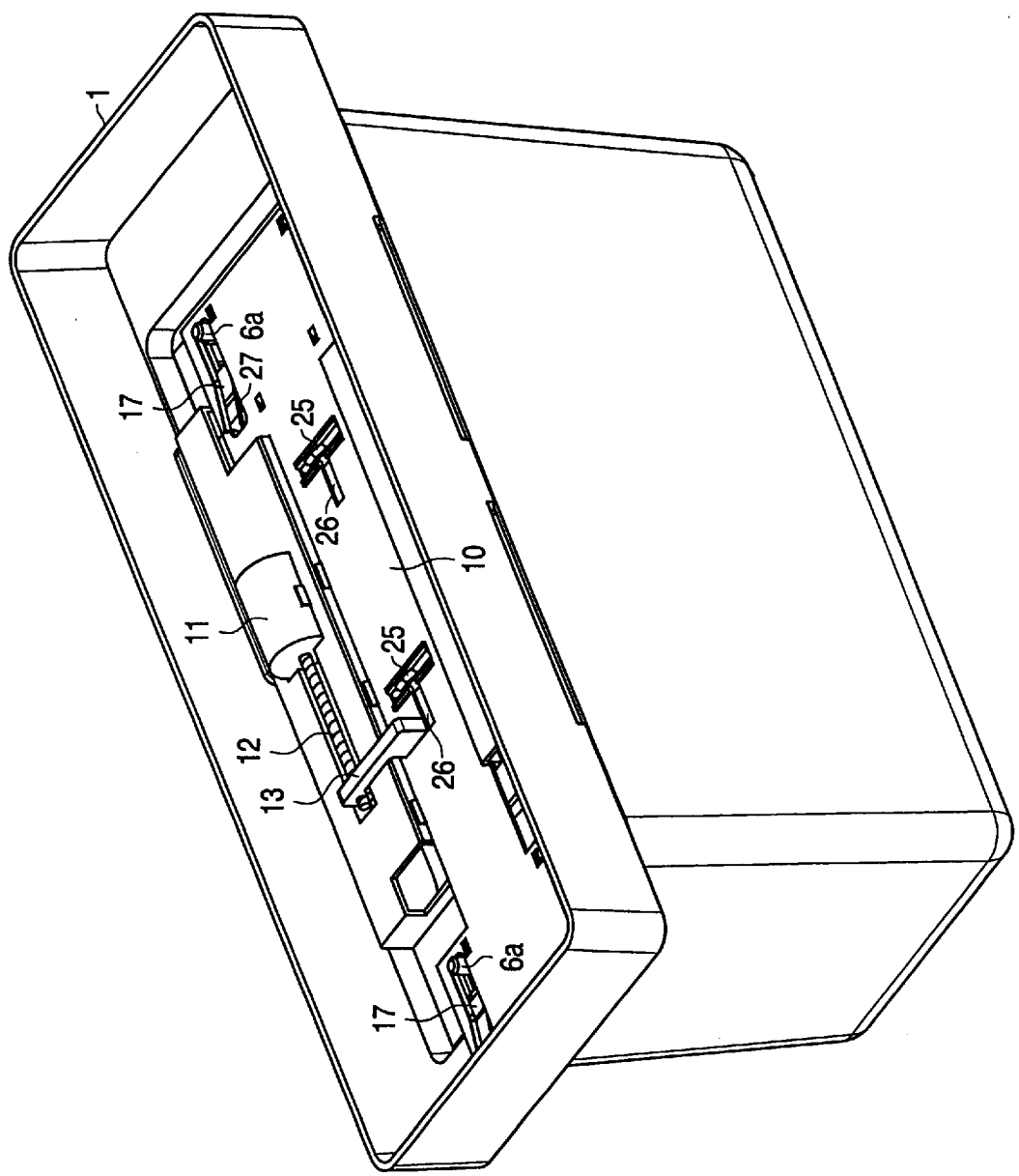
FIG. 9 diagrammatically shows the base part of the toaster of FIG. 7 without bottom plate.

FIGS. 7 to 9 show an alternative embodiment of a toaster according to the invention, where corresponding components have been given the same reference numerals as in the preceding Figures. As FIG. 7 shows, this toaster is again provided with a base part 1 on which a glass cloche 2 is placed, the latter being provided with a slot 3 through which slices of bread can be introduced into a toasting space. On either side of the toasting space, again, two heater elements 5 are positioned, in this case each formed by a ceramic tube with a helically wound incandescent wire therein. The rod-shaped heater elements 5 are supported by arms 6 which are rigidly fastened in this case in a vertical wall portion of the base part 1. The arms 6 are manufactured from an electrically conducting material, so that further current supply wires for the heater elements 5 are not necessary. Reflectors 7 are positioned behind the heater elements 5, and grille elements 8 are present between the heater elements 5 and the toasting space 4. The reflectors 7 are fixedly positioned and are manufactured from glass, with on the inside a coating of a thin, transparent layer of a metal oxide, preferably tin oxide.

The inner wall of the cloche 2, which forms the housing of the toaster, is also provided with such an infrared-reflecting tin oxide coating. A toaster for bread is obtained in this manner in which the browning process of the products introduced through the entry slot 3 into the toasting space 4 can be very well observed from the outside because in fact the toasting space 4 is entirely surrounded by transparent glass walls. This considerably enhances the comfort use of the toaster, because it can now be directly seen whether the toasting process has progressed to a point where the user considers it desirable to interrupt it.

The outside of the glass cloche 2 will remain at an acceptable temperature here because the infrared radiation of the heater elements 5 will be reflected back at least for a major portion in the direction of the product present in the toasting space by the coatings on both the reflectors and the inside of the cloche 2, so that these coated glass walls will be heated to a low degree only.

The small thickness of said coatings means that they are practically transparent, so that the toasting process can be observed from all sides of the toaster. The number of parts projecting above the base part 1 is reduced to a minimum here. The grille elements 8 are pivotably supported in the base part 1 (see also FIGS. 8a, b) by means of hinges 14. The movements towards one another and away from one another of the grille elements 8 and the up-and-down movements of the bread support 9 are fully effected by operational elements accommodated in the base part 1 in this case.

To clarify this, FIG. 9 shows the base part 1 in an open state viewed from the bottom, from which it is apparent that a reciprocating slide 10 is present in the base part 1, which slide can be moved back and forth by a motor 11 provided with a threaded spindle 12 which cooperates with an arm 13 connected to the slide 10. The grille elements 8 are connected to the base part 1 via hinges 14, as is shown in FIGS. 8a, 8b. The portion 6a of each arm 6 situated below the hinges is guided in a profiled slot 17 in the slide 10. The inside of this slot is formed by a wire spring 27 here which gives a sufficient flexibility to the construction for accommodating bread slices of different thicknesses. This operating principle may also be used in the embodiment discussed further above, in which the heater elements and the reflectors also move along with the grille elements.

The base part is further provided with two hinges 18 which are each provided with a lever arm 19 with studs 20 which are each guided in a slot 21 of the bread support 9, exactly as in the embodiment discussed further above. When the slide 10 is moved back and forth, the grille elements and the bread support 9 will now occupy an open position as shown in FIG. 8a, or a closed position as shown in FIG. 8b.

A toaster for bread is obtained in this manner in which there are no or hardly any components present around the toasting space which hamper the view of that which takes place in the toasting space, while substantially all operational elements are accommodated in a base part which can be of a comparatively flat construction, because the operation is effected mainly by means of a horizontally moving slide 10. The cloche may be simply lifted from the base part for the purpose of cleaning the apparatus. When the cloche is removed, the voltage applied to the apparatus will be cut off on both sides (both the neutral lead and the live lead). Cleaning is further facilitated in that both the reflectors and the grille elements are detachably mounted.

It is to be noted that the heater elements in the embodiments described extend over substantially the entire width of the toasting space for the purpose of covering the product to be toasted. The heater elements and the reflectors are in a fixed position in this case. The invention obviously also applies to appliances in which the heater elements and the reflectors move alongside the product to be toasted during the browning process.

What is claimed is:

1. An apparatus for toasting bread and the like, comprising a housing with a slot which issues into a toasting space in which products to be toasted can be accommodated, heater elements being arranged on either side of said space and each cooperating with a reflector arranged behind the respective element for reflecting radiation in the direction of the toasting space, characterized in that a transparent part of the housing surrounds substantially the entire toasting space and the heater elements, and said transparent part is provided on a base part in a detachable manner.

2. An apparatus as claimed in claim 1, characterized in that the housing is formed by a cloche which is manufactured from a transparent material on all sides and which surrounds the toasting space.

3. An apparatus as claimed in claim 2, characterized in that at least one of the reflectors and the wall of the cloche is provided with a transparent, infrared-reflecting coating.

4. An apparatus as claimed in claim 3, characterized in that the reflecting coating is provided on the sides of all of the reflectors which face the toasting space.

5. An apparatus as claimed in claim 3, characterized in that the reflecting coating is provided on the cloche, on the inside wall thereof.

6. An apparatus as claimed in claim 3, characterized in that the coating is formed by a transparent layer of a metal or a metal oxide.

7. An apparatus as claimed in claim 1, characterized in that the reflectors each have the shape of a concave mirror, and said heater elements are rod-shaped grille elements and are positioned in the focal lines thereof.

8. An apparatus as claimed in claim 7, characterized in that at least one of the reflectors and the grille elements for centering the products to be toasted are fastened with some tilting possibility on the heater elements by means of a detachable connection.

9. An apparatus as claimed in claim 1, characterized in that at least one of the reflectors and the grille elements are detachably and pivotably positioned on the base part.

10. An apparatus as claimed in claim 9, characterized in that said reflectors and said grille elements are detachably and pivotably positioned on the base part.

11. An apparatus as claimed in claim 4, characterized in that the reflectors each have the shape of a concave mirror, and said heater elements are rod-shaped grille elements and are positioned in the focal lines thereof.

12. An apparatus as claimed in claim 4, characterized in that the reflecting coating is provided on the cloche, on the inside wall thereof.

* * * * *